(12) United States Patent
Haupt et al.

(10) Patent No.: US 7,916,995 B2
(45) Date of Patent: Mar. 29, 2011

(54) METHOD AND DEVICE FOR RECORDING DIGITAL DATA

(75) Inventors: Dieter Haupt, Lüneburg (DE); Michael Drexler, Gehrden (DE)

(73) Assignee: Thomson Licensing, Boulogne-Billancourt (FR)

( * ) Notice: Subject to any disclaimer, the term of this patent is extended or adjusted under 35 U.S.C. 154(b) by 1268 days.

(21) Appl. No.: 11/403,240

(22) Filed: Apr. 12, 2006

(65) Prior Publication Data

US 2006/0233534 A1 Oct. 19, 2006

(30) Foreign Application Priority Data

Apr. 15, 2005 (EP) ..................................... 05090112

(51) Int. Cl.
*H04N 7/26* (2006.01)
(52) U.S. Cl. ............ 386/112; 386/98; 386/116; 386/124
(58) Field of Classification Search ..................... 386/98, 386/112, 116, 124
See application file for complete search history.

(56) References Cited

U.S. PATENT DOCUMENTS

| | | | |
|---|---|---|---|
| 2002/0164149 A1* | 11/2002 | Wilkinson ....................... | 386/46 |
| 2004/0057704 A1* | 3/2004 | Katsuo et al. ................. | 386/125 |
| 2005/0025460 A1 | 2/2005 | Hyodo et al. | |

FOREIGN PATENT DOCUMENTS

| | | |
|---|---|---|
| EP | 1 187 472 A1 | 3/2002 |
| EP | 1 465 418 A1 | 10/2004 |
| EP | 1 513 249 A1 | 3/2005 |
| GB | 2371889 A | 8/2002 |
| WO | WO 02/21845 A1 | 3/2002 |

OTHER PUBLICATIONS

Search Report, Jun. 2, 2005.

* cited by examiner

*Primary Examiner* — Thai Tran
*Assistant Examiner* — Girumsew Wendmagegn
(74) *Attorney, Agent, or Firm* — Robert D. Shedd; Robert B. Levy; Jorge Tony Villabon

(57) ABSTRACT

Various applications record or handle uncompressed video, where the amount of information needed for each frame or field is constant, based on the video frame rate and color resolution of each pixel. Since various video frame rates and audio sample rates are defined and can be combined independently, the amount of audio samples per video frame may vary. The disclosed method allows packing audio samples and video samples into constant size containers, e.g. MXF containers, so that there is an integer amount of audio samples within the time period needed for one video frame, independent from the used video raster. The method includes generating constant length KLV encoded video packets, generating variable length KLV encoded audio packets corresponding to the same time period as the video packets, generating variable length KLV encoded data packets, wherein the sum of the lengths of the audio packet and the data packet are constant, and generating from said packets a constant size content package.

13 Claims, 2 Drawing Sheets

METHOD AND DEVICE FOR RECORDING DIGITAL DATA

This application claims the benefit, under 35 U.S.C. §119 of European Patent Application 05090112.3 filed Apr. 15, 2005.

FIELD OF THE INVENTION

This invention relates to a method and a device for recording digital data.

BACKGROUND

MXF (Material exchange Format) is a file format for the interchange of audio-visual (AV) material with associated data and metadata, providing a wrapper for these data. It is packet-based and can be used e.g. to store data with associated metadata, store files in streamable format, i.e. a format that allows viewing while transferring, or wrap any compressed or uncompressed data.

Various applications, e.g. professional video cameras for digital cinematography, record or handle uncompressed video. Based on the video raster or frame rate and the colour resolution of each pixel, the amount of information needed for each frame in progressive systems, or each field in case of interlaced systems, is constant. This applies also if constant size headers are added, as done e.g. in MXF wrapping.

In addition to the video information, i.e. the actual picture item, other information is stored together with each video frame or field respectively. This information may comprise e.g. a system item containing information about e.g. the video raster, a sound item containing audio information coming along with the video, and a data item containing any kind of metadata, in particular structural metadata as opposed by descriptive metadata. The sequence of these four items, i.e. system item, picture item, sound item and data item, with a corresponding header contains the information of one frame or field and is within an MXF file repeated for every new incoming frame or field. Thus, the picture item with a constant amount of data has a constant duration, defined by the employed frame rate and video raster, e.g. $\frac{1}{24}$ seconds per frame. The associated sound item has also a constant duration that is defined by the audio sample rate, e.g. $\frac{1}{96000}$ sec per sample for 96 kHz audio sample rate. In this case, an amount of 96000/24=4000 audio samples belongs to each frame.

Since various standard video frame rates and audio sample rates are defined and can be combined independently, the amount of audio samples per video frame or field may vary.

For some combinations of video frame rates and audio sample rates however the ratio is a non-integer value. Conversion between different video systems may lead to non-integer frame rates. E.g. a video frame rate of 29.97 fps (frames per second) may be employed, corresponding to a frame duration of 1/29.97 sec. In this case the number of audio samples that match this duration is 96000/29.97=3203.203 . . . being a non-integer value. A common solution for adjusting audio and video data is to distribute the audio samples over a sequence of consecutive frames, thus achieving an average audio rate over multiple frames. But the amount of audio samples, and thus audio data, per frame is then varying, and therefore the frames have variable sizes.

SUMMARY OF THE INVENTION

The invention is based on the recognition of the following fact. For trick modes like fast forward, backward, fast backward, slow motion, single frame extraction etc. in a recording (and/or playback) device it is currently necessary to decode the file in order to find the start of an arbitrary frame or field, or any particular position.

The present invention simplifies and therefore improves this process, and thus enables e.g. accelerated trick mode. It would be desirable that the start of the information belonging to one frame/field is equidistant in terms of bytes within the file, because then a decoder can find the start of an arbitrary frame or field by applying an address offset within the file, without the need to decode the file itself. Also jumping backward or forward over a number of frames or to a given location within the file is then possible, by just adding or subtracting such offset.

In particular, the method according to the invention provides a way of packing audio samples, at any defined audio sampling frequency, and video samples into constant size containers so that there is an integer amount of audio samples within the time period needed for one video frame/field, independent from the used video raster.

According to the invention, a size range of the audio data, or sound item, within the data set belonging to a frame is determined, within which the size may vary, and according to this variation the size of the following data item is modified. Consequently, the sum of sound item and following data item within a container is constant, which achieves constant length in terms of data for all four items of a frame, and thus constant frame length.

The disclosed method is usable for recording digitized video, audio and additional system data or metadata, wherein defined video frame rate, video sample rate and audio sample rate are used. The video and audio data are not delayed before being digitized, they are coming directly from the camera or microphone respectively. The method includes a number of steps, as follows.

In a first step, system and camera parameter data or metadata are received such as e.g. video frame rate, resolution, progressive/interlaced indication, audio frame modulus, film format identifiers, scene/take/slate data, date and/or timecode data. The data can be received e.g. from a processing unit, a memory, a switch or the like.

In a second step, a first key-length-value (KLV) encoded packet is generated that contains a full frame or field of the digitized video data, wherein the frame or field corresponds to a defined time period depending on the frame rate and mode. E.g. when the video-frame rate is $\frac{1}{25}$ sec and the frame type is progressive, the time period is $\frac{1}{25}$ of a second. Since the video data are uncompressed, the first KLV encoded packet contains a defined amount of video data resulting from the number of pixels per frame or field and the number of bits per pixel. E.g. for a resolution of 1920×1080 pixels with 10 bit quantization for each of the RGB signals, the amount of data of a frame is 62208000 bits or 1944000 words with 32 bit each.

The third step is to generate a second KLV encoded packet containing the digitized audio data corresponding to the same $\frac{1}{25}$ sec as the video data mentioned above, i.e. the same time period being said defined time period, wherein the amount of data of the second KLV encoded packet depends on said defined audio sample rate and the resolution depth (word width), and the time period given by the video frame rate. E.g. for a sample rate of 96 kHz and a resolution of 24 bit, every $\frac{1}{96000}$ sec a sample of 24 bits per channel is received. The amount of audio data per time period can be calculated, e.g. 96000/25=3840 samples of 24 bit each. When the frame period is a non-integer value however, it has a corresponding non-integer number of audio samples. Then, according to the invention, the last sample will either be shifted to the next frame, or the current audio frame will be extended to include the last sample completely. Since in the first case the next audio frame may also have to include its own last sample, the size of an audio frame can vary within the range of two audio samples around an average. These possible minimum and/or maximum values are calculated and can e.g. be stored, since they need to be calculated only once as long as the audio and video parameters are stable. The decision about the number of samples in an audio frame can be done according to a fixed scheme or adaptively. A fixed scheme may e.g. be to assign to every fifth frame one sample less than to the other frames.

In the fourth step the difference between said amount of data of the second KLV encoded packet, which is an integer number of samples, and generally a predefined fixed value is calculated. This difference can be a non-integer value, or a fraction of a sample. Preferably, the predefined fixed value is the maximum possible amount of audio data.

The fifth step is to generate a third KLV encoded packet that contains at least application data, such as e.g. the timecode data, and default data, i.e. padding bytes. The amount of default data is preferably the value that was calculated in the previous step. A more general description of the fourth and fifth step is given below.

In the previously mentioned example with a video frame rate of 1/29.97, the number of audio samples over five frames is approximately constant, 5*96000/29.97≈16016, which results in 3203.2 audio samples per frame on average.

The sixth step is to generate and record an application packet that contains at least the previously generated first, second and third KLV encoded packets, i.e. the video, audio and additional data packets. Such application packet is e.g. a content packet within an MXF file, as shown in FIGS. 1 and 2. The additional data are in this example distributed to an additional data packet (DatI) and a system data packet (SysI), wherein the system data packet (SysI) has constant size.

As a result, the sum of the amount of the default data $V_{PD}$ and the amount of audio data $V_A$ is constant. Since the packets are key-length-value coded, the length of the third packet is calculated and written into the length value $L_D$.

A device for recording digitized video, audio and additional system data, wherein a defined video frame rate and sample rate and a defined audio sample rate are used, is disclosed in claim 8. Such device includes means for receiving constant length system data including camera data and constant length timecode data, like an input stage, means for generating a first KLV encoded packet containing a full frame or field of the digitized video data, wherein the frame or field corresponds to a defined time period depending on the frame rate and mode, and wherein the first KLV encoded packet contains a defined amount of video data resulting from the number of pixels per frame or field and the number of bits per pixel, means for generating a second KLV encoded packet containing the digitized audio data corresponding to the same time period being said defined time period, wherein the amount of data of the second KLV encoded packet depends on said defined audio sample rate and may vary between a minimum and a maximum value, means for calculating the difference between said amount of data of the second KLV encoded packet and said maximum value of data in the second KLV encoded packet, means for generating a third KLV encoded packet containing at least the timecode data and default data, wherein the amount of the default data is said calculated difference, and means for recording an application packet containing at least the first, second and third KLV encoded packets. This recording may in principle be done on any storage device, e.g. on a flash memory device.

In one embodiment of the invention, the apparatus further includes means for digitizing received analogue video and/or audio data, such as respective analogue-to-digital converters (ADC).

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an MXF formatted application frame with system, video, audio and auxiliary parts.

DETAILED DESCRIPTION OF THE INVENTION

Figure 4:
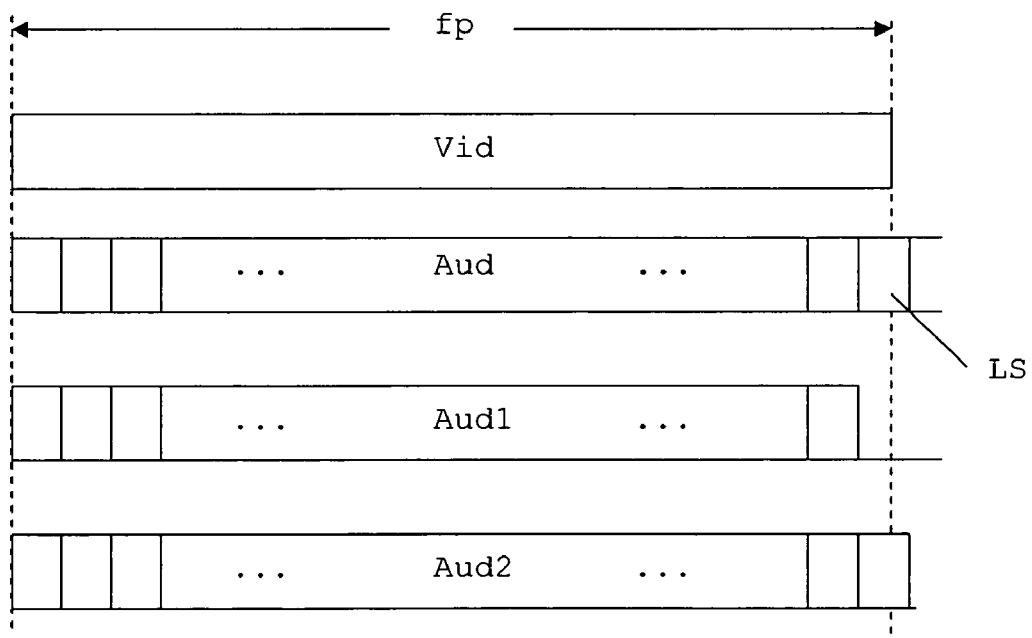
FIG. 4 audio samples during a video frame period.

In the area of cinematography and video recording, and particularly in professional video recording where no compression is used, it is a well-known problem that often the time period of video frames is no integer multiple of the duration of the audio samples. For packaging video and corresponding audio data, e.g. according to the MXF format, this would be desirable. Though the following examples are based on the MXF format, it is clear that the invention also applies to other formats. One way to achieve MXF conform representation of the sound item would be to shift few bytes of the last audio data sample LS to neighbour packets, as shown in FIG. 4, so that each packet AUD1, AUD2 representing the time of a frame period fp contains only complete audio samples, and no fractions thereof. In the consequence this leads to different lengths of the audio entries in the MXF file. In the following, progressive video system is assumed, so that only frames are mentioned. It is clear that the invention is also usable for interlaced video systems, in which case a video frame corresponds to a video field.

Figure 1:
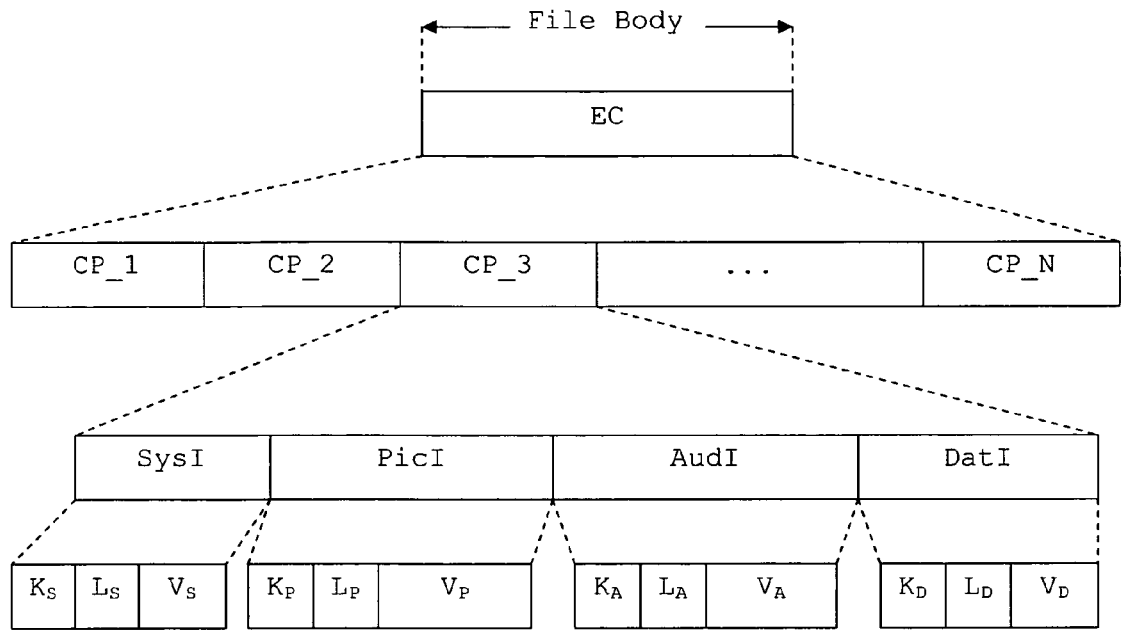

FIG. 1 shows the body of a file that is recorded in MXF format. Therefore it is also called Essence Container (EC). It is preceded by a file header that is not shown. The file body contains a number of application packets that are called Content Packages (CP_1, CP_2, CP_3, . . . , CP_N). E.g. the recording is performed on a flash memory within or attached to a camera, and the whole file belongs to a single camera take. Each Content Package (CP_1, CP_2, CP_3, . . . , CP_N) contains data corresponding to one video frame, including uncompressed video data, uncompressed audio data, system data and additional data such as structural metadata, e.g. camera parameters.

Exemplarily, the structure of Content Packages according to the invention may be as follows.

A Content Package contains four items, all of which are KLV (key-length-value) encoded. The key has a constant length of 16 bytes and indicates the type of item, the value field contains respective application data, e.g. video or audio data, and the length value has a length of 4 bytes and indicates the amount of data within the value field. Thus, the length of a Content Package can be determined as 16 bytes+4 bytes+ (the value of the length field).

Generally, a Content Package according to the invention needs to contain at least three items, namely a video or picture item PicI holding video data of a video frame period fp, an audio or sound item AudI holding audio data of the same time period, however approximated by an integer number of complete audio samples of the respective audio sampling rate, wherein the data amount of the sound item AudI may vary within a defined range, and at least one other item DatI that contains at least as many padding words as the variation range of the sound item AudI has.

The system item SysI consists of a respective key $K_S$, the length field $L_S$ and a value $V_S$. It is assumed for the invention that the length of the value $V_S$ is always four bytes, and thus the length field $L_S$ has the value four. However, although the length is constant, the MXF format prescribes the use of KLV encoding.

The picture item PicI consists of a respective key $K_P$, the length field $L_P$ and a value $V_P$. The value $V_P$ contains the uncompressed video data of a full frame, and its length indicated by the length field $L_P$ is therefore constant for all frames at least within a continuous sequence of a take.

The sound or audio item AudI consists of a respective key $K_A$, the length field $L_A$ and the value $V_A$. The value $V_A$ contains the uncompressed audio data corresponding to the time of the video frame of the picture item PicI. Its length as indicated by the length field $L_A$ is therefore not constant, but depends on the ratio between the audio sample frequency and the video frame rate.

Figure 2:
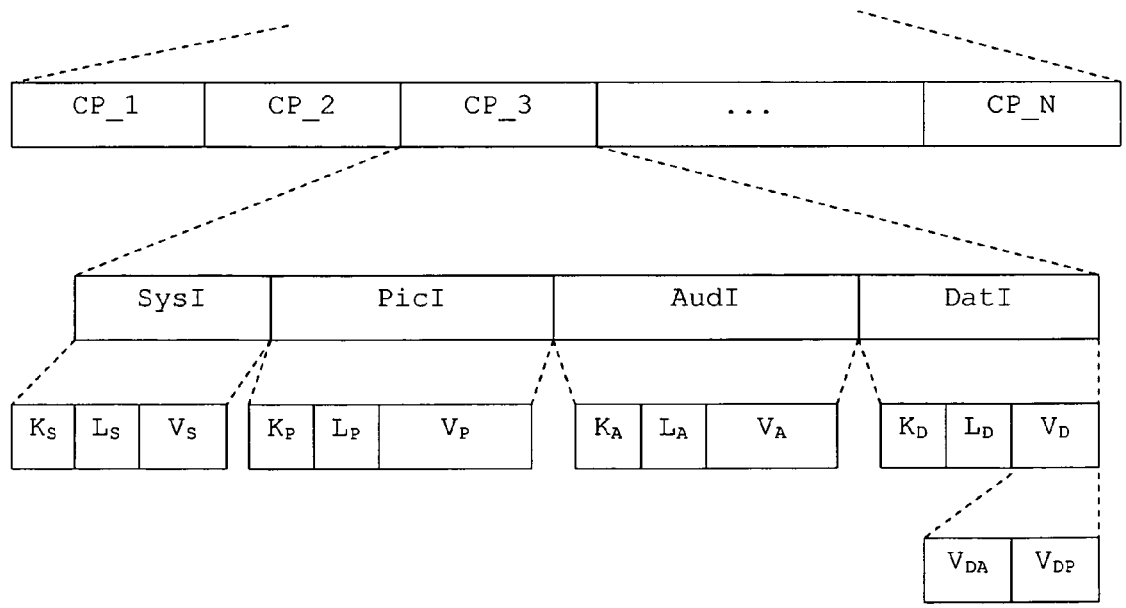
FIG. 2 an MXF formatted application frame with auxiliary part modified according to the invention.

Finally, as shown in FIG. 2, the data item DatI consists of a respective key $K_D$, the length field $L_D$ and the value $V_D$ which in turn comprises a fixed length first value $V_{DA}$ of application data and a variable length second value $V_{DP}$ of default or padding data. Its length as indicated by the length field $L_D$ is therefore not constant, but depends on the length of the preceding sound item AudI, such that the sound item AudI and the data item DatI together have a constant length. Consequently, the whole Content Package CP_3 and thus all Content Packages CP_1, CP_2, CP_3, . . . , CP_N within an Essence Container EC have constant length.

The minimum and the maximum length of any sound item can be calculated for the given video raster. Whenever the length of the sound item is smaller than the average the data item will be extended and if the sound item is longer than the average the data item is not as long.

length(sound_item(frame_*n*))+length(data_item
(frame_*n*))=const

Since the system item and the picture item have a constant length, this will lead to length(system_item(frame_*n*))+length(picture_item
(frame_*n*))+length(sound_item(frame_*n*))+
length(data_item(frame_*n*))=const The length of the data item is not as critical. Not used space within in data item can be stuffed.

Figure 3:
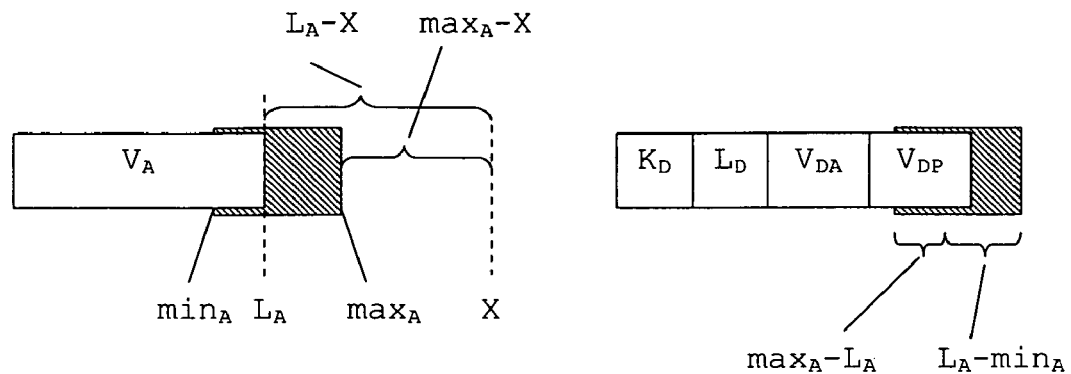
FIG. 3 details of the audio and auxiliary parts of the application frame according to the invention.

In the following, the fourth and the fifth step of the inventive method as explained above are explained in more detail according to FIG. 3.

In the fourth step the difference between the amount of data of the KLV encoded audio packet, which is an integer number of samples, and generally a predefined fixed value is calculated. This difference can be a non-integer value, or a fraction of a sample. The predefined fixed value can in principle be any value. Preferably it is the maximum possible amount of audio data, so that the difference indicates the remaining usable data amount and can only be zero or positive. As another example, it can be set to the average amount of audio samples per video frame period. The predefined fixed value will be used again in the next step.

The fifth step is to generate a third KLV encoded packet that contains at least application data, such as e.g. the timecode data, and default data, i.e. padding bytes, wherein the amount of default data is calculated as being the difference between the difference calculated in the previous fourth step and the difference between the maximum possible audio packet length and the predefined fixed value used in the previous step. As mentioned above, in the preferred variant the predefined fixed value is equal to the maximum possible audio packet length, so that the value calculated in the previous step is also the amount of default data. If the maximum audio packet length is $\max_A$, and the actual audio packet length is $L_A$ and the predefined constant value is X, then the previous step calculated ($L_A$-X), and the current step calculates the amount of default data $V_{PD}$ as:

$$V_{PD}=(\max_A-X)-(L_A-X)=\max_A-L_A$$

It is however possible to add a constant value to this number $V_{PD}$, so that it should be regarded as a minimum value.

As an example, the invention can be used in a device that is part of or attached to a video camera. This can be a memory device for recording digitized video, audio and additional system data, including means for receiving digital values from the video camera, the digital values having constant length and including camera data such as a video frame rate, video sample rate, an audio sample rate and constant length timecode data;

means for receiving analogue or uncompressed digital video and audio data from the camera, wherein the means includes analogue-to-digital conversion means for digitizing the received video and/or audio data if they are analogue data;

means for generating a first KLV encoded packet containing a full frame or field of the digitized video data, wherein the frame or field corresponds to a defined time period depending on the frame rate and mode, and wherein the first KLV encoded packet contains a defined amount of video data resulting from the number of pixels per frame or field and the number of bits per pixel, means for generating a second KLV encoded packet containing the digitized audio data corresponding to the same time period being said defined time period, wherein the amount of data of the second KLV encoded packet depends on said defined audio sample rate, means for calculating the difference between said amount of data of the second KLV encoded packet and a predefined value, means for generating a third KLV encoded packet containing at least the timecode data and default data, wherein the amount of the default data is said calculated difference, and means for recording an application packet (CP_3) containing at least the first, second and third KLV encoded packets.

Usually such device records a large number of application packets, wherein all recorded application packets have a constant length that is predefined by the amount of data and a selected amount of padding data that are stuffed into the data item packet.

Further, such device may comprise means for navigating within the file, wherein the means includes means for storing and retrieving the predefined constant length of the application packets and means for skipping application packets within the file by adding or subtracting the application packet length to or from a known address.

The invention has the advantage that navigation within the file is easily possible, since frame starts or fixed positions within frames can easily be detected and calculated, without having to investigate every packet. E.g. jumping N frames ahead (or backward) can be done by increasing (or decreasing) the address by N*(frame length). This is advantageous in all post-production steps, e.g. trick mode, backwarding, forwarding, selecting every n-th frame etc.

Advantageously, the audio sampling frequency is independent from the video raster, so that the use of standard conform sampling frequencies for audio sampling combined with standard conform video raster is possible.

Exemplarily, all application packets can be recorded in MXF format into the essence container of a single file.

What is claimed is:

1. A method for recording digitized video, audio and additional system data, wherein a defined video frame rate or field rate and a defined audio sample rate are used, including the steps of
    receiving constant length digital data including camera data and constant length timecode data;
    generating a first KLV encoded packet containing a full frame or field of the digitized video data, wherein the first packet has predetermined constant size;
    generating a second KLV encoded packet containing digitized audio data substantially corresponding, within a range of two audio samples, to said digitized video data of the first packet, wherein the digitized audio data is an integer number of audio samples that is determined by the video frame rate or field rate and the audio sample rate, and wherein said integer number of audio samples varies in successive second KLV encoded packets according to a predefined scheme;
    determining the difference between said amount of data of the second KLV encoded packet and a predefined maximum amount of data;
    generating a third KLV encoded packet containing at least the timecode data and default data, wherein the amount of the default data is said difference plus a non-negative integer constant; and
    recording an application packet containing at least the first, second and third KLV encoded packets.

2. A method according to claim 1, wherein the non-negative integer constant is zero.

3. A method according to claim 1, wherein said determining uses a fixed scheme.

4. A method according to claim 3, wherein the fixed scheme is determined by the video frame rate and the audio sample rate.

5. Method according to claim 1, wherein a plurality of application packets is recorded, and wherein all recorded application packets have the same predefined length.

6. Method according to claim 1, wherein all application packets are recorded in MXF format into a single file.

7. Device for recording digitized video, audio and additional system data, wherein a defined video frame rate or field rate and a defined audio sample rate are used, including
    means for receiving constant length digital data including camera data and constant length timecode data;
    means for generating a first KLV encoded packet containing a full frame or field of the digitized video data, wherein the first packet has predetermined constant size;
    means for generating a second KLV encoded packet containing digitized audio data substantially corresponding, within a range of two audio samples, to said digitized video data of the first packet, wherein the digitized audio data is an integer number of audio samples that is determined by the video frame rate or field rate and the audio sample rate, and wherein said integer number of audio samples varies in successive second KLV encoded packets according to a predefined scheme;
    means for determining the difference between said amount of data of the second KLV encoded packet and a predefined maximum amount of data words for packets;
    means for generating a third KLV encoded packet containing at least the timecode data and default data, wherein the amount of the default data is said calculated difference plus a non-negative integer constant; and
    means for recording an application packet containing at least the first, second and third KLV encoded packets.

8. Device according to claim 7, wherein the non-negative integer constant is zero.

9. Device according to claim 7, further comprising means for providing a fixed scheme to said means for generating a third KLV encoded packet.

10. Device according to claim 7, further comprising means for navigating within the file, wherein the means includes means for storing and retrieving the predefined constant length of the application packets and means for skipping application packets within the file by adding the application packet length to a known address.

11. A video camera comprising a device according to claim 7, wherein the received constant length digital data are camera data and the device is attached to or part of the camera.

12. A method according to claim 1, wherein the method is executed before or during video post-production.

13. A device according to claim 7, wherein the device is located in video post-production equipment.

* * * * *